United States Patent
Jung et al.

(10) Patent No.: US 10,727,507 B2
(45) Date of Patent: Jul. 28, 2020

(54) FUEL CELL SYSTEM INCLUDING RUPTURE PART BETWEEN HYDROGEN SUPPLY VALVE AND HYDROGEN SHUT-OFF VALVE

(71) Applicants: HYUNDAI MOTOR COMPANY, Seoul (KR); KIA MOTORS CORPORATION, Seoul (KR)

(72) Inventors: Se Kwon Jung, Seoul (KR); Hyo Sub Shim, Suwon-si (KR); Bu Kil Kwon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 61 days.

(21) Appl. No.: 15/612,061

(22) Filed: Jun. 2, 2017

(65) Prior Publication Data
US 2018/0175422 A1    Jun. 21, 2018

(30) Foreign Application Priority Data

Dec. 20, 2016 (KR) .......................... 10-2016-0174273

(51) Int. Cl.
*H01M 8/04082* (2016.01)
*H01M 8/04089* (2016.01)

(52) U.S. Cl.
CPC ... *H01M 8/04201* (2013.01); *H01M 8/04089* (2013.01); *Y02E 60/321* (2013.01)

(58) Field of Classification Search
CPC . H01M 8/04–04955; H01M 8/24–242; H01M 8/2465–2495
See application file for complete search history.

(56) References Cited

U.S. PATENT DOCUMENTS 3,701,360 A * 10/1972 Morrison .................. C02F 1/42
                                                    137/454.6
5,791,366 A *  8/1998 Lo ....................... F16L 55/1007
                                                    137/614.04
(Continued)

FOREIGN PATENT DOCUMENTS

JP     2006153223 A  *  6/2006
JP     2009-301743 A     12/2009
(Continued)

OTHER PUBLICATIONS

Machine translation of Omori, JP 2006-153223. Jun. 2006. (Year: 2006).*

(Continued)

*Primary Examiner* — Jonathan G Leong
*Assistant Examiner* — Jacob Buchanan
(74) *Attorney, Agent, or Firm* — Morgan, Lewis & Bockius LLP

(57) ABSTRACT

A fuel cell system including a hydrogen shut-off valve and a hydrogen supply valve connected therewith, the fuel cell system including: a holder capable of accommodating the hydrogen supply valve, wherein the holder includes a rupture part which may be formed at one point between the hydrogen supply valve and the hydrogen shut-off valve, and the hydrogen shut-off valve may be accommodated in one or more extended ends of the holder, and when the rupture part is cut off by external shock the hydrogen shut-off valve and the hydrogen supply valve are disconnected from each other.

19 Claims, 3 Drawing Sheets

(56) References Cited

U.S. PATENT DOCUMENTS

| | | | |
|---|---|---|---|
| 6,422,258 B1* | 7/2002 | DuHack | F16K 27/029 |
| | | | 137/15.09 |
| 2003/0022038 A1* | 1/2003 | Vaal | H01M 8/04223 |
| | | | 429/445 |
| 2007/0065696 A1* | 3/2007 | Fukuma | H01M 8/04089 |
| | | | 429/413 |
| 2007/0194261 A1* | 8/2007 | Kato | F16K 31/0655 |
| | | | 251/129.15 |
| 2008/0199759 A1* | 8/2008 | Adams | H01M 8/04201 |
| | | | 429/421 |

FOREIGN PATENT DOCUMENTS

| | | |
|---|---|---|
| JP | 2009301743 A * | 12/2009 |
| JP | 2011-503414 A | 1/2011 |
| JP | 2016-139590 A | 8/2016 |
| KR | 10-2015-0110201 A | 10/2015 |
| KR | 10-1646112 B1 | 8/2016 |
| WO | 2011138826 A1 | 11/2011 |

OTHER PUBLICATIONS

Machine translation of Fukuma, JP 2009-301743. Dec. 2009. (Year: 2009).*

* cited by examiner

FUEL CELL SYSTEM INCLUDING RUPTURE PART BETWEEN HYDROGEN SUPPLY VALVE AND HYDROGEN SHUT-OFF VALVE

CROSS-REFERENCE TO RELATED APPLICATION

This application claims under 35 U.S.C. § 119(a) the benefit of priority to Korean Patent Application No. 10-2016-0174273 filed on Dec. 20, 2016, the entire contents of which are incorporated herein by reference.

BACKGROUND

(a) Technical Field

The present disclosure relates to a connection structure of a hydrogen supply valve and a hydrogen shut-off valve which may be provided in a hydrogen supply system of a vehicle on which a fuel cell system may be mounted. Particularly, the present disclosure relates to a connection structure in which a holder capable of accommodating the hydrogen supply valve extends in a cantilever form to accommodate the hydrogen shut-off valve and a rupture part is formed at one predetermined point between the hydrogen supply valve and the hydrogen shut-off valve to prevent a dangerous situation in which hydrogen leaks from the hydrogen supply valve and the hydrogen shut-off valve through cut-off of the rupture part when the shock is applied.

(b) Description of Related Art

In general, a fuel cell system is configured to include a fuel cell stack generating electric energy, a fuel supply system supplying fuel (hydrogen) to the fuel cell stack, an air supply system supplying hydrogen in air, which is an oxidant required for an electrochemical reaction to the fuel cell stack, a heat and water management system controlling an operation temperature of the fuel cell stack, and the like.

High-pressure compression hydrogen with a pressure of approximately 700 bars is stored in a high-pressure container (hydrogen container) provided in the fuel supply system, that is, a hydrogen supply system and the stored compression hydrogen is discharged to a high-pressure line according to on/off of a high-pressure controller mounted on an inlet of the hydrogen container and thereafter, depressurized through a start valve and a hydrogen supply valve to be supplied to the fuel cell stack.

In this case, when components between the high-pressure container (alternatively, storage container) and the stack of the fuel cell system are described in detail, valve components including a regulator, hydrogen shut-off valves, and hydrogen supply valves and pipes through which hydrogen may flow, and multiple points that fit the pipes may be formed. Airtightness performance of the hydrogen which flows along the components is one of the most important performances associated with the safety of the hydrogen supply system, further, the entire fuel cell system. Accordingly, the hydrogen shut-off valve may be adopted between the regulator and the hydrogen supply valve in a hydrogen supply line of the fuel cell system for the safety of the high-pressure hydrogen which flows along the pipe.

For preventing the hydrogen from being leaked and minimizing hydrogen brittleness, the hydrogen supply system of the fuel cell system is manufactured to be close to a rigid body. Therefore, when external shock is applied due to an accident, and the like, an unexpected portion may be damaged. When the accident occurs, most components are damaged, and as a result, replacement of the components is required. In particular, when the pipe of the hydrogen supply system and a stack manifold are damaged, the entirety of a power train module or the entirety of a lower component of a vehicle body is removed and the components need to be thus replaced, and as a result, repairing cost may be excessively generated. Further, since the hydrogen may leak from the pipe of the hydrogen supply system and the stack manifold which are damaged, there is a concern about occurrence of a secondary damage such as fire, or the like.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with prior art.

Therefore, the present disclosure provides a connection structure of a hydrogen supply valve and a hydrogen shut-off valve which can minimize a damage of a pipe of a hydrogen supply system and prevent hydrogen from leaking when external shock or a load is applied by providing a value connection/association structure to induce a rupture to occur between the hydrogen supply valve and the hydrogen shut-off valve when strong shock is applied to a vehicle on which a fuel cell system is mounted from the outside (an accident, etc.).

In one aspect, the present disclosure provides a fuel cell system including a hydrogen shut-off valve and a hydrogen supply valve connected with the hydrogen shut-off valve and specifically, the fuel cell system, which includes: a holder capable of accommodating any one of a driving unit of the hydrogen supply valve and a driving unit of the hydrogen shut-off valve, wherein the holder includes a rupture part which may be formed at one point between the hydrogen supply valve and the hydrogen shut-off valve, and any one of the hydrogen supply valve and the hydrogen shut-off valve may be fastened to one extended end of the holder to correspond to the type of the valve accommodated in the holder and as the rupture part is cut off by external shock, the hydrogen shut-off valve and the hydrogen supply valve are disconnected from each other.

In a preferred embodiment, the one extended end of the holder may have a cantilever shape.

In another preferred embodiment, the one extended end of the holder may have a '⊏' shape of which a center portion is empty.

In still another preferred embodiment, the hydrogen shut-off valve, the hydrogen supply valve, and the holder may be attached onto one surface of a stack manifold of the fuel cell system.

In yet another preferred embodiment, a lower end of the hydrogen supply valve may be in communication with the stack.

In still yet another preferred embodiment, the holder may be disposed on an upper end of the stack of the fuel cell system.

In a further preferred embodiment, one end of the hydrogen shut-off valve or the hydrogen supply valve leads in the opposite valve which is in communication as stated above.

In another further preferred embodiment, the fuel cell system may further include an O-ring which may be disposed at one point of an area of the opposite valve which is in communication as stated above, in which one end of the hydrogen shut-off valve or the hydrogen supply valve leads.

In still another further preferred embodiment, the hydrogen shut-off valve may be fastened to the holder by a screw and a fastening direction of the screw may be parallel to a gravity direction.

In yet another further preferred embodiment, the fuel cell system may further include O-ring which may be disposed on one end of an area where the hydrogen shut-off valve is inserted into the holder, wherein the hydrogen shut-off valve may be fastened to the holder by the screw and the fastening direction of the screw and a plane formed by the O-ring may not meet each other and may be parallel to each other.

In still yet another preferred embodiment, a flow path connecting the hydrogen shut-off valve and the hydrogen supply valve may be formed at the center of the rupture part.

In a still further preferred embodiment, a notch may be formed in the rupture part.

The present disclosure provides the following effects through the means for solving problems.

According to the present disclosure, when shock at a predetermined level or higher is applied from the outside, a rupture part is cut off, and as a result, a hydrogen shut-off valve and a hydrogen supply valve are separated from each other to seal a pipe connected to a high-pressure container and a pipe connected to a stack manifold.

According to the present disclosure, hydrogen can be prevented from being leaked by sealing each pipe, and as a result, secondary dangerous situations including fire, explosion, and the like by the leakage of the hydrogen can be prevented.

According to the present disclosure, as the hydrogen supply valve and the hydrogen shut-off valve are cut off from each other, a pipe of a hydrogen supply system connected from a high-pressure container and the pipe of the hydrogen supply system connected to the stack manifold may be separated from each other. Therefore, in spite of the stack manifold which droops down by the shock, the damages of the pipe of the hydrogen supply system connected from the high-pressure container and the hydrogen shut-off valve can be minimized.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not imitative of the present disclosure, and wherein.

Figure 1:
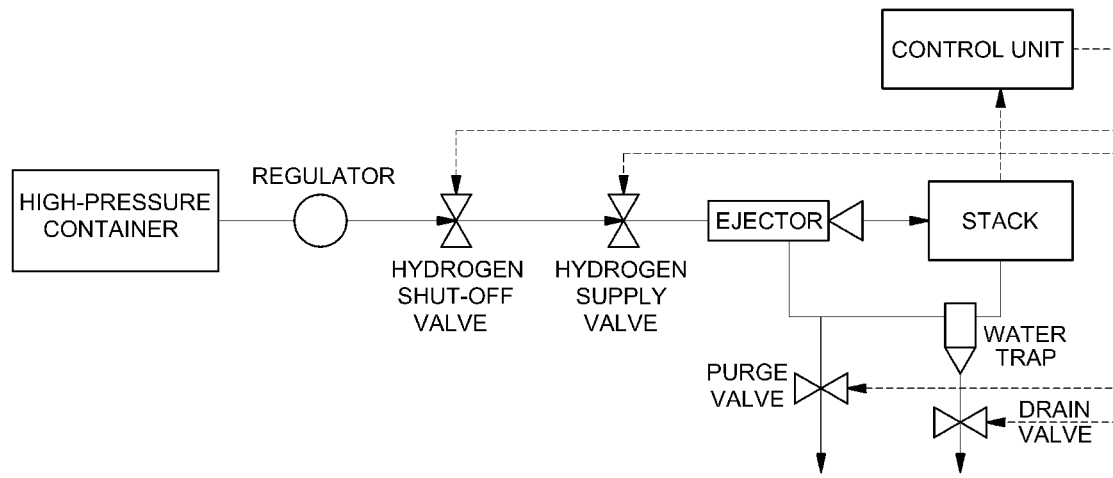
FIG. 1 is a diagram illustrating an embodiment of a connection relationship among components of a fuel cell system including a hydrogen supply valve and a hydrogen shut-off valve of the present disclosure.

Reference numerals set forth in the Drawings includes reference to the following elements as further discussed below:

100: holder capable of accommodating hydrogen shut-off valve and hydrogen supply valve
110: rupture part of holder
120: flow path of holder
200: O-ring It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Terms including "part", "unit", "module", and the like disclosed in the specification mean a unit that processes at least one function or operation and this may be implemented by hardware or software or a combination of hardware and software.

A fuel cell system mounted on a vehicle may be generally configured to include a fuel cell stack generating electric energy, a fuel supply device supplying fuel (hydrogen) to the fuel cell stack, an air supply device supplying oxygen in air, which is an oxidant required for an electrochemical reaction to the fuel cell stack, a cooling system removing reaction heat of the fuel cell stack to the outside and controlling an operation temperature of the fuel cell stack, and a control unit capable of opening/closing a plurality of valves provided in the fuel cell system.

A manifold may be formed on one end of a stack in which power is generated in the fuel cell system. The manifold (stack manifold) of the fuel cell stack may serve as a support of the stack and a flow path member through which gas and cooling water before and after a reaction may flow in or be discharged from a fuel cell. In detail, the stack manifold supports or includes an end plate of the stack and may serve to supply or distribute water, air, and/or hydrogen to the stack.

FIG. 1 is a diagram illustrating a connection relationship among components of a fuel cell system according to an embodiment of the present disclosure. Referring to FIG. 1, a high-pressure container containing the hydrogen may exist as a fuel storage container in a hydrogen fuel supply system. The hydrogen may be preferably contained and used as a fuel in the high-pressure container and high-pressure hydrogen gas at approximately 700 bar may be stored in the high-pressure container.

According to FIG. 1, the control unit of the fuel cell system according to the present disclosure is electrically connected to the hydrogen supply valve, the hydrogen shut-off valve, a purge valve, and a drain valve to control opening and/or closing of each valve by a signal and communication. Furthermore, the control unit is connected even with the stack to receive state information of the stack, such as voltage, current, and a temperature of the stack.

A regulator as a component apparent to those skilled in a field of the fuel cell system may depressurize the high-pressure hydrogen contained in the high-pressure container and supply the depressurized hydrogen to a rear end of the regulator. Moreover, since an ejector, the stack, the purge valve, a water trap, and the drain valve which are also components apparent to those skilled in the art of the fuel cell system are component which are generally used, a detailed description thereof will be hereinafter omitted.

Turning to FIG. 1, the pipe of the hydrogen supply system is shown between the high-pressure container and the stack and the hydrogen may flow from the high-pressure container to the stack along the pipe of the hydrogen supply system. The regulator, the hydrogen shut-off valve, and the hydrogen supply valve may be positioned on the hydrogen supply system. In a layout order of the components of the hydrogen supply system according to the embodiment of the present disclosure, the regulator, the hydrogen shut-off valve, and the hydrogen supply valve may be disposed on the hydrogen supply system in order according to an order in which the components are disposed to be closer to the high-pressure container. That is, the hydrogen shut-off valve may be provided at one point of the hydrogen supply line between the regulator and the hydrogen supply valve.

The fuel cell system may be assembled and mounted onto a fuel cell vehicle by using a mounting bracket and/or a bushing which is similar to a general engine. Further, the pipes of the hydrogen supply system may be assembled to a vehicle body at a predetermined interval prescribed by regulations of a corresponding country for each country. The pipes of the hydrogen supply system may be fastened with the hydrogen shut-off valve by using a fitting or quick connector (one-touch fitting) structure in the fuel cell system.

Meanwhile, the hydrogen supply valve according to the embodiment of the present disclosure may be a normally-closed (NC) type valve. The hydrogen supply valve may be formed to include a driving unit. The driving unit of the hydrogen supply valve may control the amount of hydrogen supplied to the stack together with an in-container regulator formed in the high-pressure container or a regulator which may be provided on a flow path which extends from the high-pressure container. The hydrogen supply valve may be preferably configured by a solenoid type valve which may be driven by an electromagnet. The hydrogen supply valve may principally perform a feed-back control to control the hydrogen supply amount by comparing the pressure of an anode and the pressure of the hydrogen supply line. In detail, the control unit receives the pressure of the anode, which is measured by a pressure sensor of the anode and the control unit may increase a duty of current applied to the hydrogen supply valve when the measured pressure of the anode is lower than a target pressure of the anode. As a result, an opening degree of the hydrogen supply valve is controlled, and as a result, the amount of the supplied hydrogen may be controlled. When it is sensed that an error occurs in the vehicle, for example, when external force having a maximum value or higher which may be endured by the hydrogen supply valve, such as occurrence of a vehicle accident, or the like is applied to the hydrogen supply valve, the hydrogen supply valve may be automatically closed and a flow of hydrogen may be shut off between front and rear ends of the hydrogen supply valve.

Meanwhile, the hydrogen shut-off valve according to the embodiment of the present disclosure may be the normally-closed (NC) type valve. The hydrogen shut-off valve according to the present disclosure may be provided on the pipe of the hydrogen supply system, which extends from one end of a hydrogen inlet/outlet of the high-pressure container. The hydrogen shut-off valve may be a valve for shutting off the hydrogen which may be discharged from the high-pressure container in the case of emergency. Accordingly, in normal times, that is, when the vehicle is normally driven without a problem, the vehicle may maintain an opened state. However, when the external force at a predetermined criterion or more is applied to the vehicle due to external causes including a collision, the accident, and the like, the hydrogen shut-off valve may be closed in order to shut-off the leakage of the hydrogen from the high-pressure container. In detail, when external force having a strength or higher which may be endured by the pipe of the hydrogen supply system of the vehicle is applied, and as a result, the collision or accident of a degree at which the pipe of the hydrogen supply system may be exposed to a damage risk occurs, the hydrogen shut-off valve is automatically closed to restrict the flow of the hydrogen between the front and rear ends of the hydrogen shut-off valve.

Hereinafter, a structure and a connection relationship of the hydrogen supply system of the fuel cell system including the hydrogen supply valve and the hydrogen shut-off valve will be described with reference to FIGS. 2 to 6.

Figure 2:
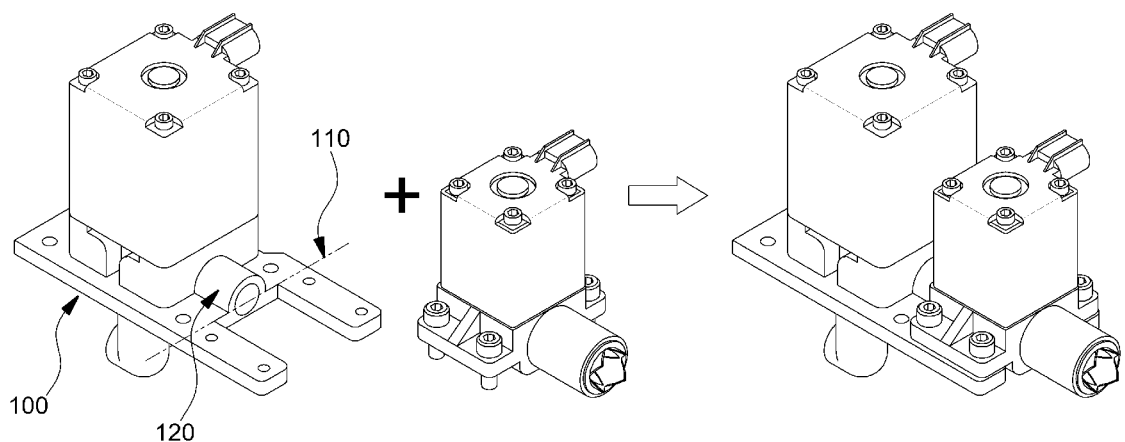
FIG. 2 as a diagram illustrating an embodiment of the present disclosure is a diagram illustrating that the hydrogen shut-off valve is fastened to a holder accommodating the hydrogen supply valve.

FIG. 2 is a diagram illustrating a connection structure of the hydrogen supply valve and the hydrogen shut-off valve according to the embodiment of the present disclosure. According to FIG. 2, in the present disclosure, a holder 100 for accommodating the hydrogen supply valve and the hydrogen shut-off valve may be illustrated.

The holder 100 may be divided into one area in which the hydrogen supply valve or the hydrogen shut-off valve may be accommodated and the other area extended from one area. In detail, the driving unit of the hydrogen supply valve or a driving unit of the hydrogen shut-off valve may be accommodated in one area and a valve corresponding to the valve accommodated in one area may be fastened to the other area. In detail, the valve may be screw-fastened to the holder 100 in the other area.

That is, in the present disclosure, when the hydrogen supply valve is accommodated in the holder 100, the hydrogen shut-off valve may be fastened in the other area extended from the holder 100 to correspond thereto. Similarly, when the hydrogen shut-off valve is accommodated in the holder 100, the hydrogen supply valve may be fastened in the other area extended from the holder 100 to correspond thereto. Furthermore, the hydrogen supply valve or the hydrogen shut-off valve which may be fastened to the other area having a beam shape may be fastened to the holder 100 at an upper side or a lower side of the other area extended in the beam shape.

Accordingly, as various embodiments of the present disclosure, a case where the hydrogen shut-off valve is fastened to the upper side or lower side of the other area extended in the beam shape in the holder 100 in which the hydrogen supply valve is accommodated in one area, a case where the hydrogen supply valve is fastened to the upper side or lower side of the other area extended in the beam shape in the holder 100 in which the hydrogen shut-off valve is accommodated in one area, and the like may be considered.

A flow path 120 which may be connected from a recirculation blower or the water trap is formed on a lower end of one area of the holder 100 at which the hydrogen supply valve is positioned. Therefore, the flow path 120 formed on the lower end of one area of the holder 100 may be connected with the inside of the hydrogen supply valve.

The hydrogen supply valve of the present disclosure may be connected with the stack by the flow path formed on one end. In addition, the flow path connecting the hydrogen shut-off valve and the hydrogen supply valve may exist between the hydrogen supply valve and the hydrogen shut-off valve. In detail, a flow path 120 is formed at the center of the holder 100 between the hydrogen supply valve and the hydrogen shut-off valve to connect the hydrogen supply valve and the hydrogen shut-off valve. That is, the flow path 120 at the center of the holder 100 may supply or move the hydrogen discharged from the high-pressure container to the hydrogen supply valve from the hydrogen shut-off valve.

Meanwhile, the other area of the holder 100 accommodating the hydrogen shut-off valve may be formed in a cantilever form in the holder 100. That is, the other area of the holder 100 may be formed in the beam shape having no separate support member on the lower end thereof.

Referring back to FIG. 2, according to a preferred embodiment of the present disclosure, the width of the other area of the holder 100 may be smaller than that of one area of the holder 100. Preferably, the other area of the holder 100 may be formed to extend a long direction of the holder 100 with a predetermined width from both short-direction end points of one area of the holder 100. In summary, the other area of the holder 100 may be formed in a 'ㄷ' shape. In this case, a hollow may be formed at the center portion of the other area of the holder 100. Moreover, a lower size of the hydrogen shut-off valve may be controlled to correspond to the size of the hollow of the 'ㄷ'-shaped other area of the holder 100. Moreover, a screw hole, and the like may be installed on the other area of the holder 100. Therefore, the hydrogen shut-off valve may be accommodated to correspond to the hollow size of the other area of the holder 100 and a valve outer circumference or a bracket of the hydrogen shut-off valve may be screw-fastened to the holder 100. Further, the other area may be configured in a 'ㄴ' shape by deleting one portion of the other area. In addition, contrary to this, the other area may be configured in the hydrogen shut-off valve in the 'ㄷ' or 'ㄴ' shape.

Figure 3:
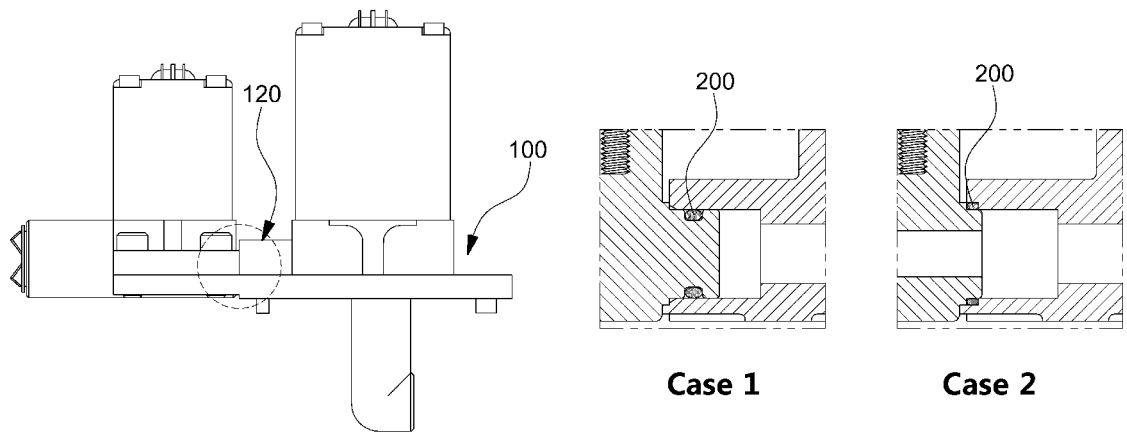
FIG. 3 is a diagram illustrating an embodiment in which the hydrogen shut-off valve and the holder may be fastened to each other as an embodiment of the present disclosure.

FIG. 3 is a diagram illustrating various embodiments in which the hydrogen shut-off valve and the hydrogen supply valve may be connected in the holder 100. Referring to FIG. 3, one end of the flow path in the hydrogen shut-off valve may be inserted into the flow path 120 which may be formed between the hydrogen shut-off valve and the hydrogen supply valve in the holder 100. That is, a diameter of the hydrogen flow path of the hydrogen shut-off valve may be smaller than the diameter of the flow path 120 which may be formed in the holder 100 and the flow path of the hydrogen shut-off valve may be inserted into the flow path 120 of the holder 100.

An O-ring 200 may be disposed between the flow path of the hydrogen shut-off valve and the flow path 120 formed in the holder 100. The O-ring 200 may prevent the leakage of the hydrogen at a connection portion of the hydrogen shut-off valve and the hydrogen supply valve.

Meanwhile, it should be noted that the hydrogen flow path of the hydrogen shut-off valve needs to be inserted into the flow path 120 of the holder 100 at a degree so as to release fastening of a sealing portion between the flow path of the hydrogen shut-off valve and the flow path 120 of the holder 100 when the cantilever beam is broken.

When the hydrogen shut-off valve and/or the hydrogen supply valve are directly fixed apart from the beam structure and the rupture part 110 and a direction of a screw that fixes the valves is a vertical direction to the gravity direction, the screw that fixes two valves needs to be broken in order to cut off the hydrogen supply valve and the hydrogen shut-off valve on a boundary surface between the hydrogen supply valve and the hydrogen shut-off valve. Therefore, in this case, an effect in which the screw is broken by shock having predetermined external force or more only when a predesigned dedicated screw is used may be expected. Accordingly, in one preferred embodiment of the present disclosure, a direction in which the hydrogen shut-off valve and/or the hydrogen supply valve is screw-fastened to the holder 100 may be parallel to a gravity direction.

Referring to FIG. 3, in Case 1, coupling performance of the hydrogen shut-off valve and the holder 100 is excellent, but it may be relatively difficult to separate the hydrogen shut-off valve and the holder 100 from each other when the rupture part 110 is cut off. In Case 2, as one preferred embodiment of the present disclosure, it is easy to separate the hydrogen shut-off valve from the holder 100 when the rupture part 110 is cut off by the external force while the hydrogen shut-off valve and the holder 100 are fixed by the O-ring 200. That is, in one preferred embodiment of the present disclosure, the hydrogen shut-off valve may lead in or be inserted into the flow path 120 of the holder 100 as large as the width of a sealing member such as the O-ring 200, or the like. Further, according to an embodiment of the present disclosure, one end of the hydrogen supply valve may lead in the hydrogen shut-off valve, while one end of the hydrogen shut-off valve may lead in the hydrogen supply valve.

Figure 4:
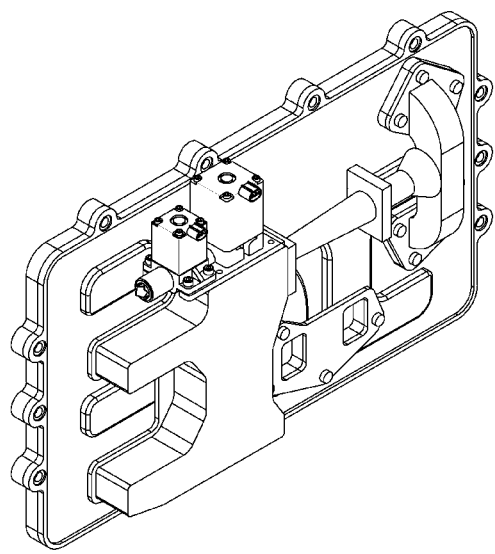
FIG. 4 is a diagram illustrating a state in which the holder is attached to one side of a stack manifold, which is viewed from the side according to an embodiment of the present disclosure.
Figure 5:
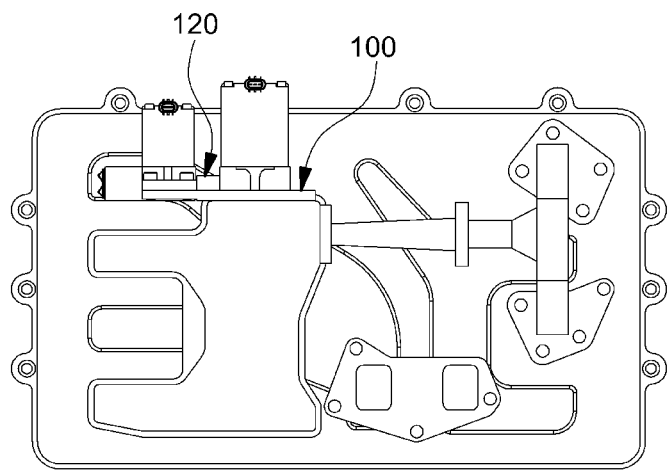
FIG. 5 is a diagram illustrating the state in which the holder is attached to one side of a stack manifold, which is viewed from the front according to an embodiment of the present disclosure.

Meanwhile, FIGS. 4 and 5 are diagrams illustrating a state in which a structure including the hydrogen supply valve and the hydrogen shut-off valve in the present disclosure is fastened to a stack, in detail, a manifold of the stack. Referring to FIGS. 4 and 5, an area which may be attached to the stack may be formed on one surface of the hydrogen supply valve in the present disclosure. In detail, while the hydrogen supply valve and the hydrogen shut-off valve are fastened to the holder 100, an area for attachment to the stack may be formed on the same surface. In the present disclosure, the hydrogen shut-off valve may be disposed on the beam which is a part of the holder 100 of the hydrogen supply valve and in detail, the hydrogen supply valve is fastened with the manifold of the stack to be connected to the hydrogen supply flow path to the stack.

Therefore, the hydrogen supply valve and the hydrogen shut-off valve may be positioned on the same surface based on the stack, in detail, the manifold of the stack and the holder 100 including the hydrogen supply valve and the hydrogen shut-off valve may be positioned on an upper end of the stack. In this case, it may be advantageous in that only the holder 100 including the hydrogen supply valve and the hydrogen shut-off valve may be separated and replaced even while the entire fuel cell system is mounted on the vehicle.

Meanwhile, the rupture part 110 may be formed at one point on the holder 100 between the hydrogen supply valve and the hydrogen shut-off valve. According to an embodiment of the present disclosure, the rupture part 110 may be formed at a point where the cantilever-shaped beam of the holder 100 starts. That is, an upper point and a lower point of a longitudinal (vertical) member positioned at a left side in the 'ㄷ' shape may become the rupture part 110 of the holder 100.

The rupture part 110 is a point which may be cut off by the external shock applied to the fuel cell system and as the rupture part 110 is cut off, one holder 100 may be separated into two or more.

As the rupture part 110 is cut off, the flow path connecting the hydrogen supply valve and the hydrogen shut-off valve may be cut off in the holder 100. Therefore, in the holder 100, the hydrogen supply system of the fuel cell system may be separated into one sealed system including the high-pressure container, the pipe between the high-pressure container and the hydrogen shut-off valve, and the hydrogen shut-off valve and the other sealed system including the hydrogen supply valve, the pipe between the hydrogen supply valve and the stack, and the stack.

According to yet another embodiment of the present disclosure, a notch may be formed at an area or point where the rupture 110 of the holder 100 is formed. In detail, the notch may be formed at one point or a plurality of points of the area which may become the rupture part 110. The notch is formed, and as a result, when the external shock is applied, stress concentrates on the notch and cut-off occurs at the point where the notch is formed. Therefore, when the notch is formed, a cut-off point of the rupture part 110 by the external force may be more definite. The size, the width, and the depth of the notch may be variably designed according to the design specification and designed differently depending on a quality of the material and the strength of the corresponding holder 100, endurable external force, and a limit of the shock.

Figure 6:
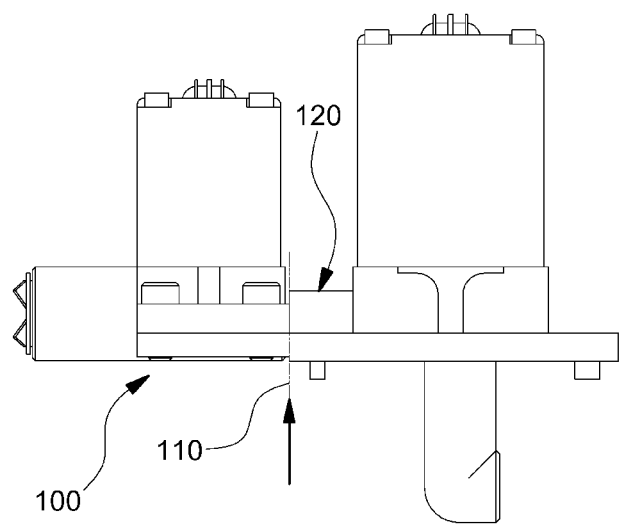
FIG. 6 is a diagram illustrating a point where a rupture part may be formed in a state in which the hydrogen shut-off valve and the hydrogen supply valve are accommodated in the holder as an embodiment of the present disclosure.

FIG. 6 is a diagram illustrating the holder 100 accommodating the hydrogen shut-off valve and the hydrogen supply valve according to a preferred embodiment of the present disclosure. More preferably, in FIG. 6, the rupture part 110 may be formed at a point indicated by an arrow and the holder 100 may be cut off at the rupture part 110 by the external shock.

In summary, an aspect of the present disclosure relates to a holder accommodating a hydrogen shut-off valve and a hydrogen supply valve of a hydrogen supply system of a fuel cell system to be adjacent to each other, and, more specifically, the hydrogen shut-off valve may be disposed on a cantilever extended from one or more points (e.g., a rupture part) of the holder, and, if the rupture part is cut off by an external shock, and as a result, the hydrogen supply valve and the hydrogen shut-off valve are separated from each other.

That is, it should be noted that the present disclosure is characterized in that as the high-pressure container, the pipe extended from the high-pressure container, and the hydrogen shut-off valve may form one sealed system filled with the hydrogen and the stack, the pipe extended to the stack, and the hydrogen supply valve may form the other sealed system filled with the hydrogen, the hydrogen is prevented from being leaked in the hydrogen supply system of the fuel cell system.

Embodiments of the present disclosure have been explained and described, but it will be appreciated by those skilled in the art that the present disclosure may be modified and changed in various ways without departing from the spirit of the present disclosure described in the claims by the addition, change, deletion or addition of constituent elements, and that the modifications and changes are included in the claims of the present disclosure.

In describing the exemplary embodiment of the present disclosure, detailed description of known function or constitutions will be omitted if they make the gist of the present disclosure unclear. In addition, the used terms as terms which are specially defined in consideration of functions in the exemplary embodiment of the present disclosure may vary depending on the intention or usual practice of a user or an operator. Accordingly, the terms need to be defined base on contents throughout this specification. Accordingly, the detailed description of the invention does not intend to limit the present disclosure as the disclosed embodiment and it should be interpreted that the appended claims also include other embodiments.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell system including a hydrogen shut-off valve and a hydrogen supply valve connected with the hydrogen shut-off valve, the fuel cell system comprising:
    a holder accommodating at least one of a driving unit of the hydrogen supply valve or a driving unit of the hydrogen shut-off valve,
    wherein the holder includes a rupture part which is formed at one point of the holder between the hydrogen supply valve and the hydrogen shut-off valve,
    wherein at least one of the hydrogen supply valve or the hydrogen shut-off valve corresponding to a type of valve accommodated in the holder is fastened to one extended end of the holder, and when the rupture part is cut off by external shock the hydrogen shut-off valve and the hydrogen supply valve are disconnected from each other,
    wherein one of the hydrogen supply valve or the hydrogen shut-off valve is detachably mounted on one end of the holder in a first direction, and a remaining one of the hydrogen supply valve or the hydrogen shut-off valve is detachably mounted on another end of the holder in the first direction, and
    wherein the rupture part is arranged between the one end and the another end of the holder in a second direction different from the first direction.

2. The fuel cell system of claim 1, wherein the one extended end of the holder has a cantilever shape.

3. The fuel cell system of claim 2, wherein the one extended end of the holder has a 'U' shape of which a center portion is empty or an 'L' shape of which a center portion and one side are empty.

4. The fuel cell system of claim 1, wherein the hydrogen shut-off valve, the hydrogen supply valve, and the holder are attached onto one surface of a stack manifold of the fuel cell system.

5. The fuel cell system of claim 1, wherein a lower end of the hydrogen supply valve is in communication with a fuel cell stack.

6. The fuel cell system of claim 1, wherein the holder is disposed on an upper end of a fuel cell stack of the fuel cell system.

7. The fuel cell system of claim 1, wherein one end of the hydrogen shut-off valve leads in the hydrogen supply valve or one end of the hydrogen supply valve leads in the hydrogen shut-off valve.

8. The fuel cell system of claim 1, further comprising an O-ring arranged at an interface between the hydrogen shut-off valve and the hydrogen supply valve.

9. The fuel cell system of claim 1, wherein the hydrogen shut-off valve is fastened to the holder by a screw and a fastening direction of the screw is parallel to a gravity direction.

10. The fuel cell system of claim 1, further comprising:
an O-ring which is disposed on one end of an area where the hydrogen shut-off valve is inserted into the holder, wherein the hydrogen shut-off valve is fastened to the holder by a screw and the fastening direction of the screw and a plane formed by the O-ring do not meet each other and are parallel to each other.

11. The fuel cell system of claim 1, wherein a flow path connecting the hydrogen shut-off valve and the hydrogen supply valve is formed at a center portion of the rupture part.

12. The fuel cell system of claim 1, wherein a notch is formed in the rupture part.

13. The fuel cell system of claim 1, wherein the at least one of the hydrogen supply valve or the hydrogen shut-off valve fastened to the one extended end of the holder is fastened above the one extended end.

14. The fuel cell system of claim 1, wherein the at least one of the hydrogen supply valve or the hydrogen shut-off valve fastened to the one extended end of the holder is fastened below the one extended end.

15. The fuel cell system of claim 1, further comprising a flow path on a lower end of one area of the holder to be connected with an inside of the hydrogen supply valve.

16. The fuel cell system of claim 1, further comprising another holder, wherein any one of the driving unit of the hydrogen supply valve or the driving unit of the hydrogen shut-off valve is detachably mounted on the holder, and a remaining one thereof is detachably mounted on the another holder, which is also fastened to said one extended end of the holder.

17. The fuel cell system of claim 1, wherein the holder has an opening in which at least one of the driving unit of the hydrogen supply valve or the driving unit of the hydrogen shut-off valve is accommodated.

18. The fuel cell system of claim 1, wherein the at least one of the driving unit of the hydrogen supply valve or the driving unit of the hydrogen shut-off valve is fixedly attached to a manifold while a remaining one of the hydrogen supply valve or the hydrogen shut-off valve is disposed at a free end of the holder.

19. A fuel cell system including a hydrogen shut-off valve and a hydrogen supply valve connected with the hydrogen shut-off valve, the fuel cell system comprising:
a holder accommodating at least one of a driving unit of the hydrogen supply valve or a driving unit of the hydrogen shut-off valve, and
a flow path formed at a center of the holder between the hydrogen supply valve and the hydrogen shut-off valve to connect the hydrogen supply valve and the hydrogen shut-off valve,
wherein the holder includes a rupture part which is formed at one point of the holder between the hydrogen supply valve and the hydrogen shut-off valve,
wherein at least one of the hydrogen supply valve or the hydrogen shut-off valve corresponding to a type of valve accommodated in the holder is fastened to one extended end of the holder, and when the rupture part is cut off by external shock the hydrogen shut-off valve and the hydrogen supply valve are disconnected from each other,
wherein one of the hydrogen supply valve or the hydrogen shut-off valve is detachably mounted on one end of the holder in a first direction, and a remaining one of the hydrogen supply valve or the hydrogen shut-off valve is detachably mounted on another end of the holder in the first direction, and
wherein the rupture part is arranged between the one end and the another end of the holder in a second direction different from the first direction.

* * * * *